US006938159B1

(12) United States Patent
O'Connor et al.

(10) Patent No.: US 6,938,159 B1
(45) Date of Patent: Aug. 30, 2005

(54) CONTINUOUS VERIFICATION SYSTEM (75) Inventors: Michael O'Connor, Cupertino, CA (US); Luke Girard, Santa Clara, CA (US); Jeff Schiffer, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/405,520

(22) Filed: Sep. 23, 1999

(51) Int. Cl.[7] .................................................. H04L 9/32
(52) U.S. Cl. ..................................................... 713/186
(58) Field of Search ................................ 713/200, 186; 382/115

(56) References Cited

U.S. PATENT DOCUMENTS

| | | | | |
|---|---|---|---|---|
| 4,461,028 A | * | 7/1984 | Okubo ....................... | 382/115 |
| 5,229,764 A | * | 7/1993 | Matchett et al. ........... | 340/5.52 |
| 5,910,999 A | * | 6/1999 | Mukohzaka ................ | 382/124 |
| 6,148,094 A | * | 11/2000 | Kinsella ..................... | 382/124 |
| 6,256,737 B1 | * | 7/2001 | Bianco et al. .............. | 713/186 |
| 6,310,966 B1 | * | 10/2001 | Dulude et al. .............. | 382/115 |

OTHER PUBLICATIONS

VERIDICOM; "Enabling Technology for Personal, Electronic Authentication"; 1997; pp. 2.
Authentec, Inc.; "Frequently Asked Questions"; pp. 3.
Authentec, Inc.; "E-Field Technology"; pp. 2.

* cited by examiner

*Primary Examiner*—Gregory Morse
(74) *Attorney, Agent, or Firm*—Blakely, Sokoloff, Taylor & Zafman LLP

(57) ABSTRACT

A method and apparatus for authenticating a user's identity are disclosed.

In one embodiment, a data collector continuously receives and collects a stream of biometric data from a user. After the data collector passes on the biometric data to a data matcher, the data matcher continuously processes the data to authenticate the user's identity.

15 Claims, 8 Drawing Sheets

CONTINUOUS VERIFICATION SYSTEM

FIELD OF THE INVENTION

This invention relates to authentication technology generally and particularly to continuous authentication based on biometric data.

BACKGROUND OF THE INVENTION

As computing devices evolve from a standalone-operating model to a networked-operating model, more and more computing devices communicate with one another via some network configuration, such as the Internet. However, many businesses, educational or governmental entities have been reluctant to fully utilize this networked-operating model. One concern relates to the lack of an adequate mechanism for verifying the security of the transactions involved and the participants involved.

Some attempts have been made to resolve this security issue. One approach verifies an individual's identity by examining his or her physical trait or behavioral characteristics, such as a fingerprint, retina, signature, voice pattern or palm print. These characteristics can also be referred to as biometric data. Fingerprint identification is one such example of biometric authentication.

Today's fingerprint identification technology however has several flaws. First, since exterior contaminants and biological factors such as dryness and callus constantly affect skin, this identification mechanism often results in high false acceptance ratio or false rejection ratio. In addition, the current identification mechanism tends to employ a static approach, where authentication is performed once only. As a result, not only does the static approach yield a high probability of errors, an individual seeking to defeat the verification process can also fraudulently substitute appropriate biometric data as his or her own. For example, person B has her confidential financial records protected by her fingerprint information. In other words, in order to access B's financial records, B's fingerprint is required. With that knowledge, person A can attempt to obtain person B's fingerprint information. Since authentication is only performed once, as long as A is able to pass that one validation step, A can then proceed to access any of B's confidential information.

Therefore, as has been demonstrated, a method or an apparatus is needed to continuously authenticate a user's identity.

SUMMARY OF THE INVENTION

A method and apparatus for authenticating a user's identity are disclosed.

In one embodiment, a data collector continuously receives and collects a stream of biometric data from a user. After the data collector passes on the biometric data to a data matcher, the data matcher continuously processes the data to authenticate the user's identity.

BRIEF DESCRIPTION OF THE DRAWINGS

The present invention is illustrated by way of example and is not limited by the figures of the accompanying drawings, in which like references indicate similar elements, and in which.

DETAILED DESCRIPTION

A method and apparatus for authenticating a user's identity are disclosed. In the following description, numerous specific details are set forth, such as fingerprints, networked configurations, a first identity reference, a second identity reference, etc. in order to provide a thorough understanding of the present invention. However, it will be apparent to one of ordinary skill in the art that the invention may be practiced without these particular details. In other instances, well-known elements and theories such database, sensor technology, capture technology, signal conversion technology, network technology, etc. have not been discussed in special details in order to avoid obscuring the present invention.

Additionally, the term, "biometric data", is used throughout the following discussion to refer to a user's unique physical trait or behavioral characteristics. Some examples are, but not limited to, fingerprints, palm prints, retina, body odor, DNA, facial features, iris patterns, signatures and voice patterns. On the other hand, "input data" refers to data entered into a system by a user. One example of "input data" is, but not limited to, data generated by a user's typing on a keyboard or clicking on a mouse. Lastly, "false acceptance ratio" and "false rejection ratio" respectively relate to the probability of falsely accepting an individual's identity and the probability of falsely rejecting an individual's identity, respectively.

Figure 1:
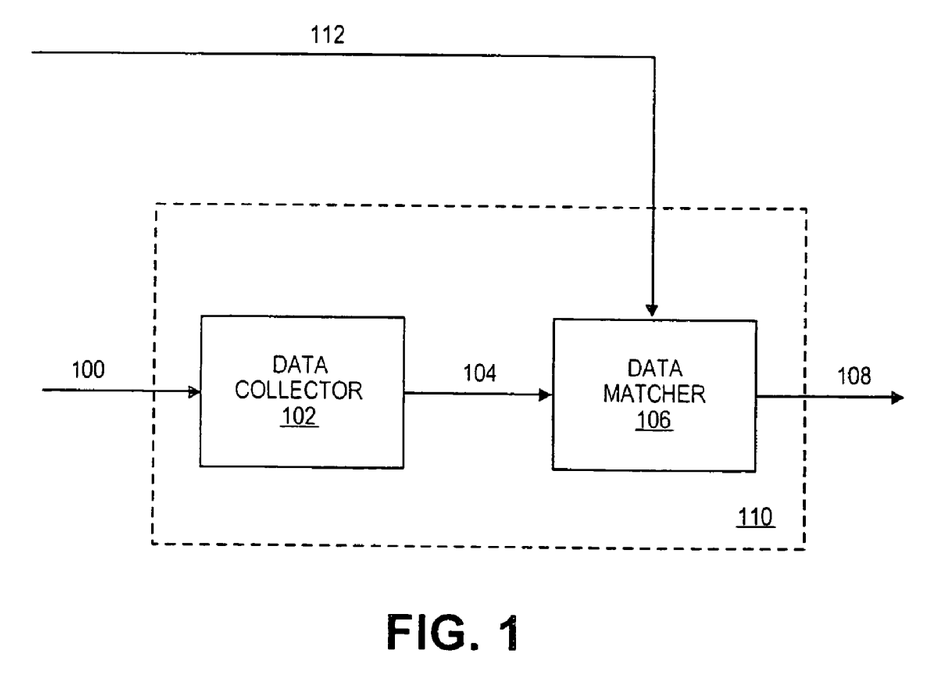
FIG. 1 illustrates a general block diagram of one embodiment of an authentication system.

FIG. 1 is a general block diagram of one embodiment of authentication system. Referring to FIG. 1, data collector 102 receives biometric data 100 from a user and continuously processes the received data. After some processing, data collector 102 sends processed data 104 to data matcher 106. Processed data shown in FIG. 1 represent converted biometric data 100, where the converted data tend to be some storable or recognizable form of data for data matcher 106 to store and operate on.

Then data matcher 106 continuously produces an output signal 108 either based on processed data 104 alone or based on both processed data 104 and user information 112. User information 112 represents user profile information, such as relevant identity information. The data may be downloadable from an external database through a network, such as the internet. Output signal 108 comprises information indicating the authenticity of the user's identity. Since data matcher 106 operates on ever changing processed data 104, information contained in output signal 108 may vary. It should be noted that signals such as 100, 104, 108 and 112 may or may not have some levels of authenticity or integrity checks.

Figure 2A:
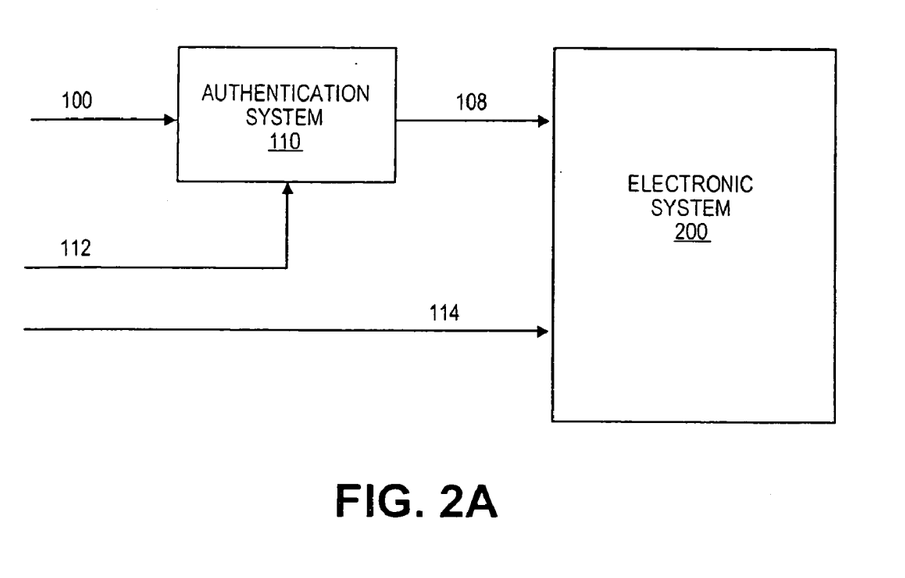
FIG. 2(a) illustrates a block diagram of one embodiment of an authentication system and an electronic system.

FIG. 2(a) illustrates a general block diagram of one embodiment of authentication system 110 coupled to electronic system 200. After authentication system 110 produces output signal 108 indicative of an acceptance of the user's identity, electronic system 200 proceeds to process input data 114. Some examples of input data 114 are, but not limited to, the user's document files, keystroke inputs, voice commands, etc. Output signal 108, however, is constantly being reevaluated. Whenever the user's identity changes and output signal indicates a rejection of the user's identity, electronic system 200 ceases to accept and operate on input data 114.

To further demonstrate the configuration shown in FIG. 2(a), authentication system 110 performs retinal scan for an Automatic Teller Machine (ATM) user. The ATM machine, or electronic system 200, does not process the user's keystroke input information, or input data 114, until authentication system 110 verifies the user's identity. Further, authentication system 110 continues to perform retinal scan during the user's transaction and generates output signal 108 indicative an acceptance or a rejection of the user's identity. If authentication system 10 fails to authenticate the user's identity, the ATM machine terminates any further processing of the user's inputs.

Figure 2B:
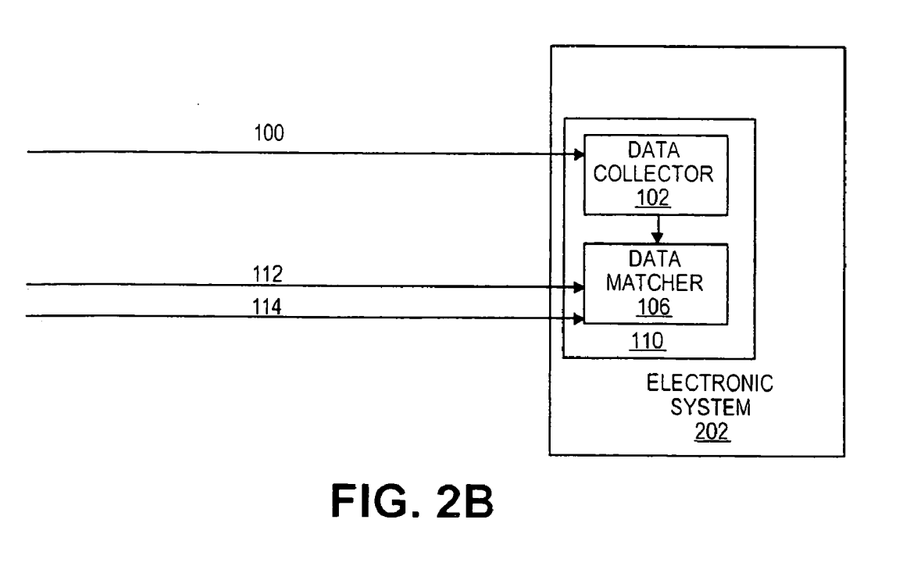
FIG. 2(b) illustrates a block diagram of another embodiment of an authentication system and an electronic system.

Moreover, FIG. 2(b) illustrates a general block diagram of another configuration of authentication system 110 coupled to electronic system 202. In this instance, not only is authentication system 110 part of electronic system 202, electronic system 202 may also combine input data 114 with the user's identity information through its data matcher 106.

As an illustration, a university utilizes electronic system 202 to administer an exam on-line for its students. Authentication system 110 may continuously monitor and examine the student's data entry and attempted solutions. In one scenario, biometric data 100 relate to the student's fingerprint information, and input data 114 are the student's attempted exam answers. As data matcher 106 determines the authenticity of the student according to biometric data 100 and user information 112, data matcher 106 may also embed the student's identity information with his attempted exam answers. This combined information may go to other subsystems of electronic system 202 for other processing or to other electronic system 202s for further verification. The embedded identity information can serve as an additional level of security validation for documents in transit.

Some examples of electronic systems 200 and 202 are, but not limited to, add-in circuit boards, standalone electronic apparatuses and general-purpose computer systems. Electronic system 200 as a general-purpose computer system is illustrated in FIG. 3(a) and electronic system 202 as a general-purpose computer system in FIG. 3(b).

Figure 3A:
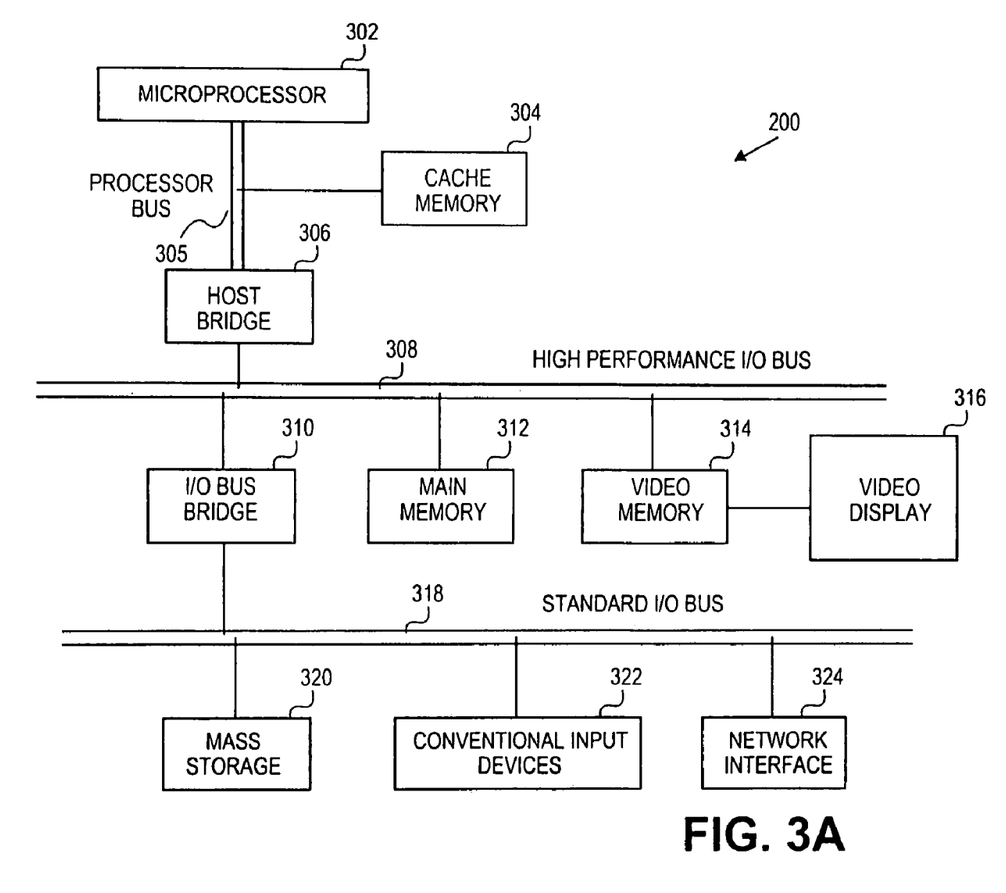
FIG. 3(a) illustrates a block diagram of a general-purpose computer with conventional input devices.

The system architecture illustrated in FIG. 3(a) comprises microprocessor 302 and cache memory 304 coupled to each other through processor bus 305. Sample electronic system 200 also includes high performance I/O bus 308 and standard I/O bus 318. Processor bus 305 and high performance I/O bus 308 are bridged by host bridge 306, whereas high performance I/O, bus 308 standard I/O bus 318 are bridged by I/O bus bridge 310. Coupled to high performance I/O bus 308 are main memory 312 and video memory 314. Alternatively, main memory 312 can also be coupled to host bridge 306. Coupled to video memory 314 is video display 316. Additionally, a video processing device may also be coupled to host bridge 306. Coupled to standard I/O bus 318 are mass storage 320, network interface 324 and conventional input device 322. These elements perform their conventional functions well known in the art. In particular, input device 322 allows a user to enter input data 112. Network interface 324 allows electronic systems 200 to communicatively couple to a network and exchange data with the network.

Figure 3B:
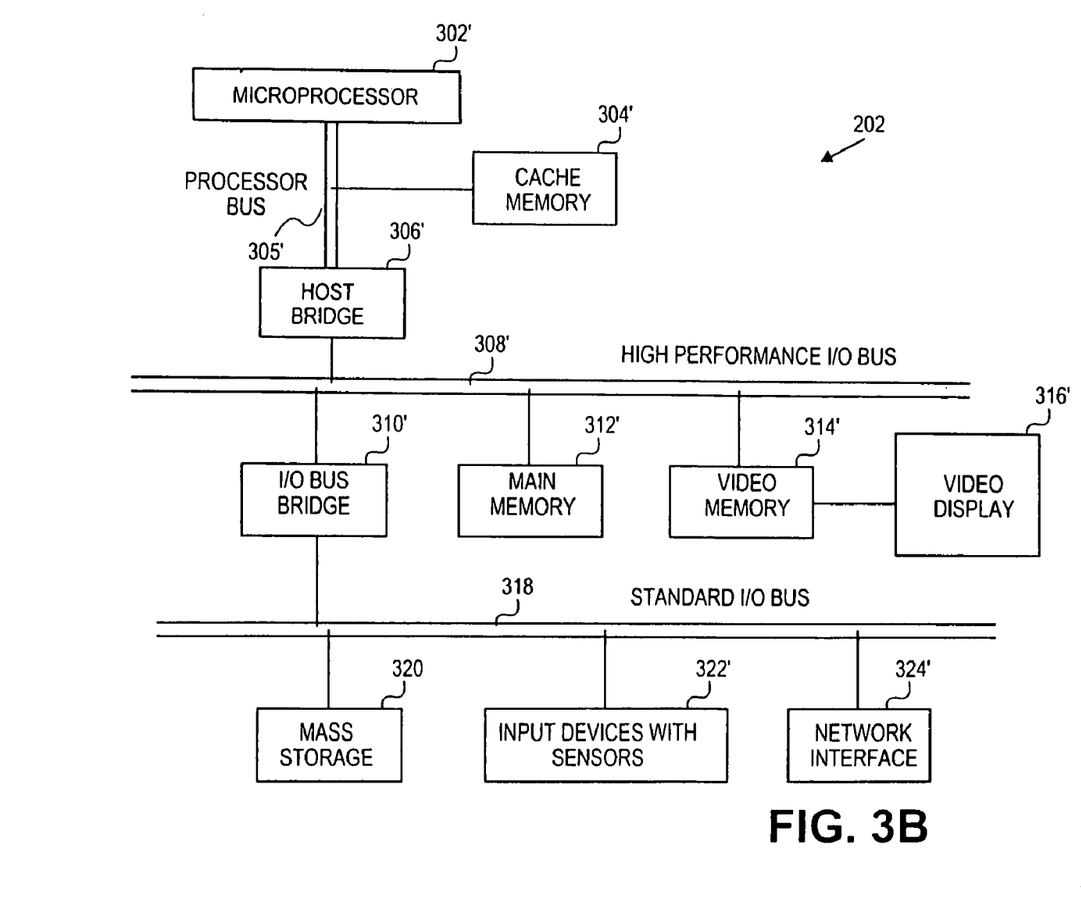
FIG. 3(b) illustrates a block diagram of a general-purpose computer with input devices with sensors.
Figure 4:
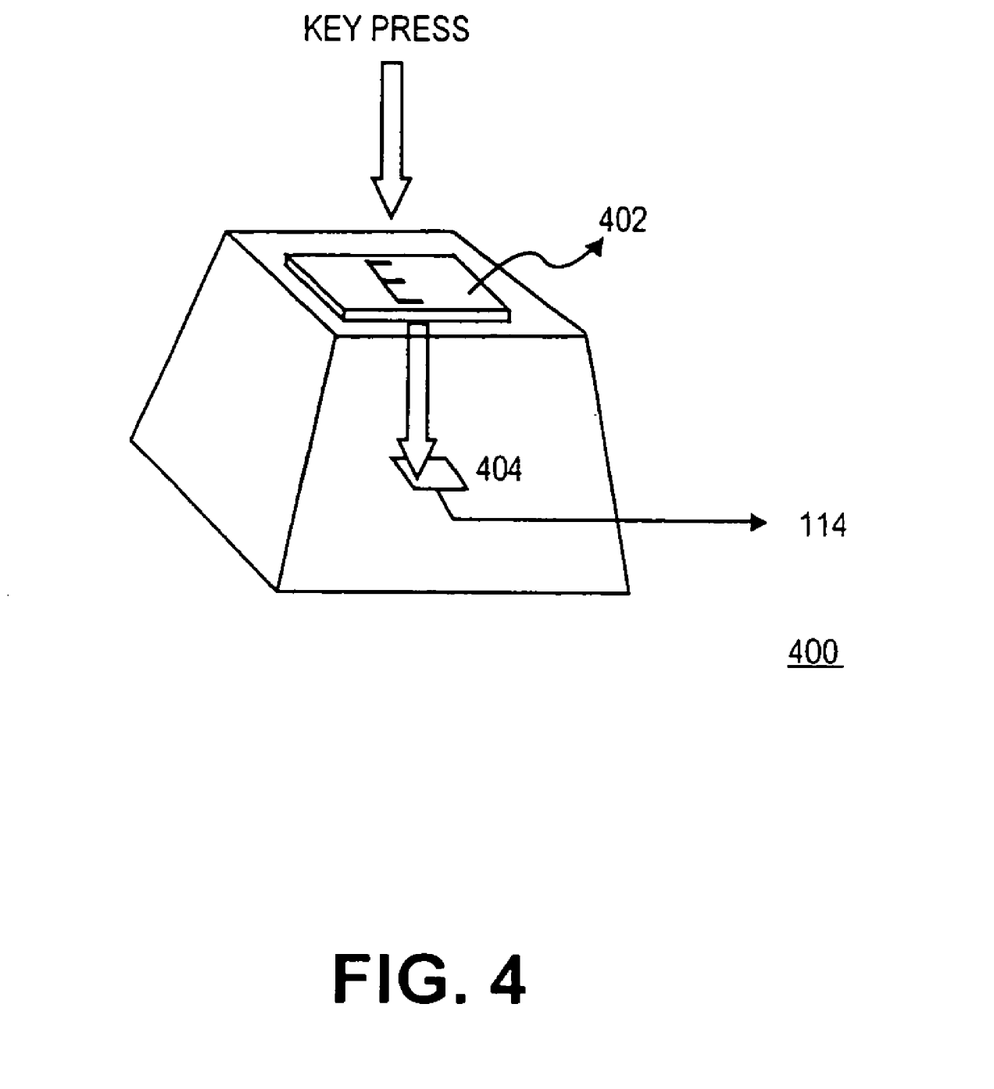
FIG. 4 illustrates one embodiment of a special key with a sensor.

Identical to electronic system 200 except for one component, electronic system 202 shown in FIG. 3(b) utilizes input devices with sensors 322' instead of conventional input devices 322. One example of input device 322' is a special keyboard, where the special keyboard can generate both input data 114 and biometric data 100 for electronic system 202 in response to a user's typing on it. More specifically, this special keyboard places sensors on its frequently used keys, such as the "e" key, or key 400, as shown in FIG. 4. When a user presses key 400, not only is input data 114 corresponding to "e" generated from key contact switch 404, but the user's biometric data 100 is also collected through sensor 402 of key 400. This collection mechanism is further discussed in subsequent sections.

Furthermore, mass storage 320 of electronic system 202 may provide permanent storage for the executable instructions for an embodiment of authentication system 110. Electronic system 202's main memory 312 may temporarily store the executable instructions of an embodiment of authentication system 110 during execution by microprocessor 302.

Operation of Authentication System 110

Authentication system 110 discloses an apparatus and a method for continuously verifying a user's identity. Specifically, one embodiment of authentication system 110 comprises data collector 102 and data matcher 106. Data collector 102 receives and collects a stream of biometric data from a user, and data matcher 106 continuously processes the user's biometric data to authenticate the user's identity.

Figure 5:
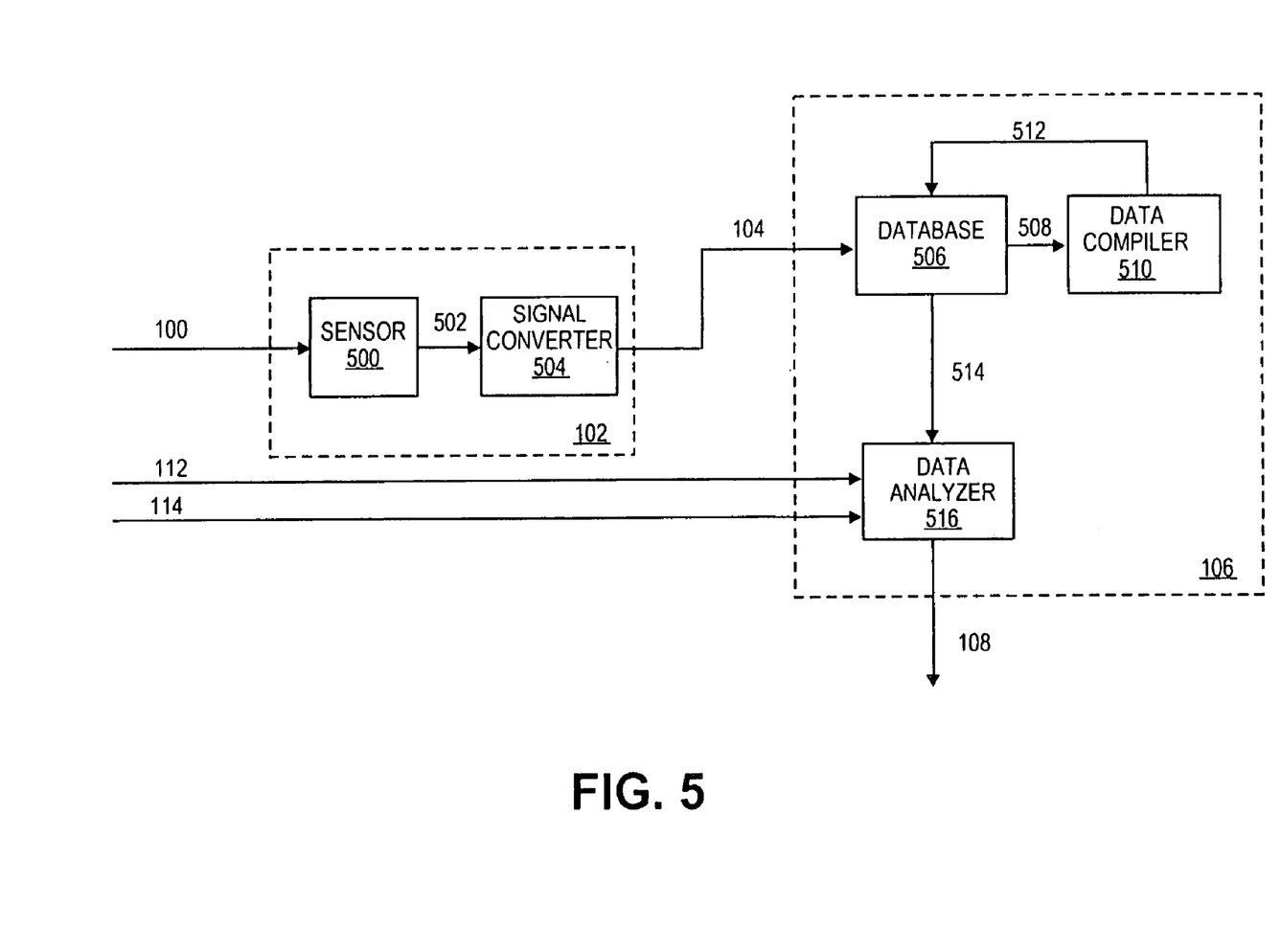
FIG. 5 illustrates a general block diagram of one embodiment of a data collector and a data matcher.

In one implementation, data collector 102 comprises sensor 500 and signal converter 504 as shown in FIG. 5. Sensor 500 detects appropriate biometric data for a user. One such biometric data is the user's fingerprint. Although fingerprint will be used as the biometric data in the following discussions, it should be apparent to one ordinary skilled in the art to apply authentication system 110 to other biometric data. With fingerprint, data collector 102 may utilize any sensor technologies suitable to its design parameters. Some existing sensor technologies are, but not limited to, optical, DC capacitive, resistive and E-Field technologies. Some sensor technologies acquire information relating to the top surface of the finger, and others read beneath the surface of the finger.

Once sensor 500 has acquired the necessary fingerprint information, acquired data 502 are sent to signal converter 504 for conversion. Signal converter 504 continuously transforms acquired data 502 to processed data 104. Processed data 104 are recognizable or storable by data matcher 106. As an illustration, assuming acquired data 502 are analog signals and data matcher 106 is a digital system, signal converter 504 can then perform an analog to digital signal conversion on the analog signals. As a result, processed data 104 contain the corresponding binary information of acquired data 502. With binary data format, data matcher 106 recognizes or is capable of storing processed data 104. Even though the preceding discussion focuses on one particular type of signal, one ordinarily skilled in the art may utilize other types of signal conversion in signal converter 504 without exceeding the scope of the disclosed authentication system 110.

After biometric data 100 has been collected and has undergone some signal conversion, data matcher 106 proceeds to operate on processed data 104. One embodiment of data matcher 106 is shown in FIG. 5. In the embodiment, data matcher 106 comprises database 506, data compiler 510 and data analyzer 516. Database 506 contains entries of processed data 104 and an identity reference of a user. As data compiler 510 begins to receive more data through signal path 508, data compiler 510 may modify the identity reference stored in database 506 through signal path 512. Signal path 508 may contain either database 506's stored processed data 104 or the identity reference.

Figure 6:
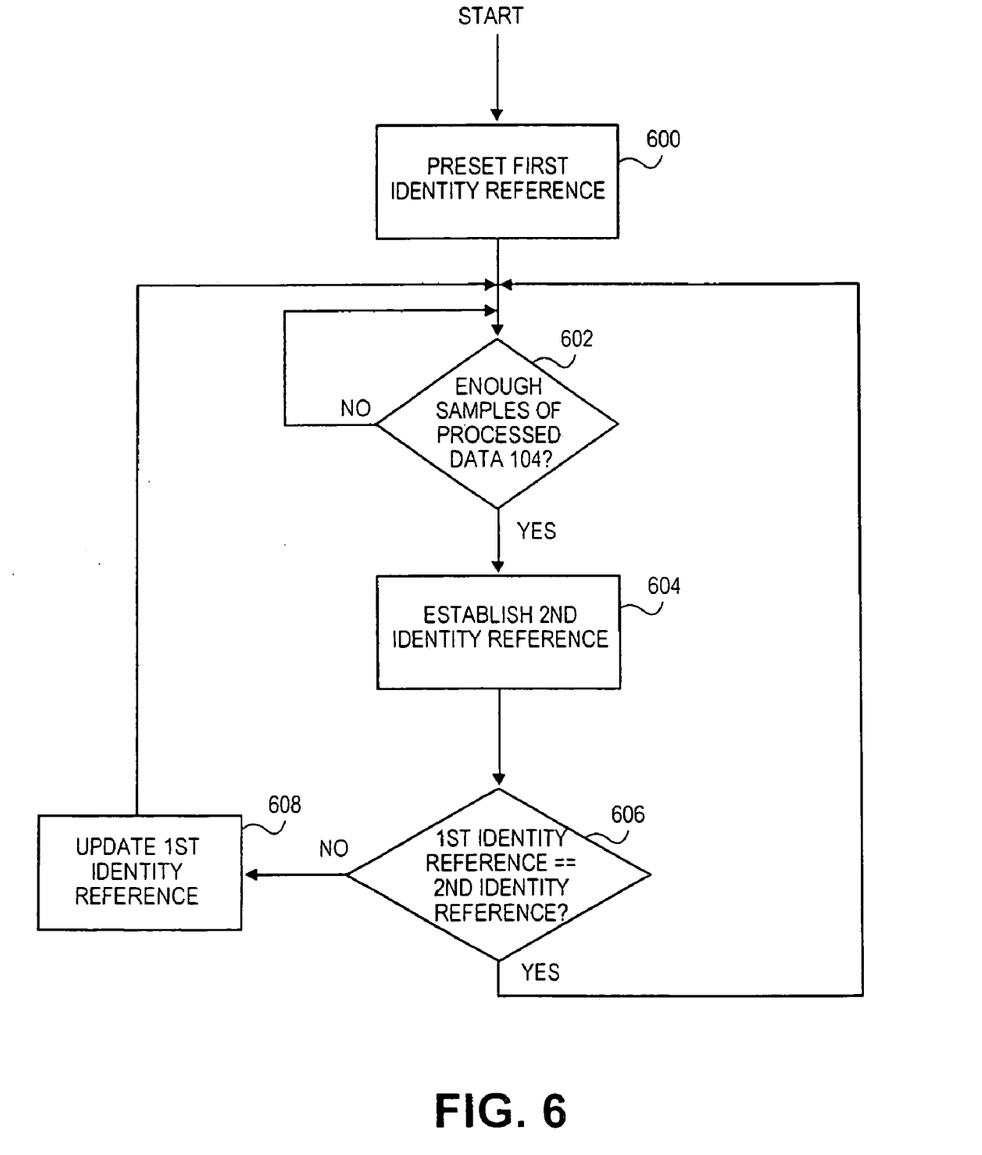
FIG. 6 illustrates a flow diagram of a data compiling process.

FIG. 6 describes a flow chart of a process performed by one embodiment of data compiler 510. For clarification purposes, the previously mentioned identity reference is separated into a first and a second identity reference. Data analyzer 516 compares user information 112 with the first identity reference to generate output signal 108, and the second identity reference serves as a working copy of data compiler 510's construction of the user's biometric data.

Before data compiler 510 derives information from signal path 508, a first identity reference is arbitrarily established in step 600. This initial reference remains unchanged until data compiler 510 has sufficient number of processed data 104 samples from database 506 to proceed past step 602. In step 604, since enough samples have been received, data compiler 510 integrates these data samples over time to establish a second identity reference. This identity reference generation process is analogous to techniques utilized in photographing astronomical objects with discrete element sensor arrays.

Using fingerprint as an example, a user is likely to press on sensor 500 at different locations or at different angles with varying strength. Consequently, the corresponding processed data 104 of the same user's fingerprint will likely differ each time. By integrating a large number of these processed data 104 samples over time, the resulting second identity reference will reduce the false acceptance ratio or false rejection ratio over approaches utilizing only a single or a small number of data samples. The resulting second identity reference also represents data compiler 510's estimate of the user's fingerprint. It is important to note that the mentioned "large number" does not equate to an absolute number. Instead, the number is determined based on factors such as, but not limited to, the type of sensor 500 deployed, experimental results from the sensor, the desired false acceptance ratio and the desired false rejection ratio.

Having established a second identity reference in step 604, data compiler 510 compares the first identity reference with the second identity reference in step 606. In one implementation, when a difference between the two references exists, data compiler 510 proceeds to modify the first identity reference through signal path 512 in step 608. In another embodiment, data compiler 510 may update the first identity reference when the difference between the first and the second identity reference exceeds a certain threshold. Regardless of the outcome in step 606, as long as data collector 102 continues to receive biometric data 100 from the user, data compiler 510 maintains its process of evaluating incoming processed data 104, establishing the second identity reference and updating the first identity reference.

In order to generate output signal 108, data analyzer 516 receives the first identity reference from database 506 through signal path 514. Data analyzer 516 then compares the first identity reference with user information 112. Data analyzer 516 may employ different comparison mechanisms without exceeding the scope of the disclosed authentication system 110. For instance, data analyzer 516 may accept the user's identity when the first identity reference matches user information 112. In another approach, data analyzer 516 may affirm the user's identity when the two data are sufficiently equal to one another. For example, 90% matching may qualify to be sufficiently equal. Alternatively, data analyzer 516 may implement a programmable or adjustable threshold to establish this level of sufficiency.

Figure 7:
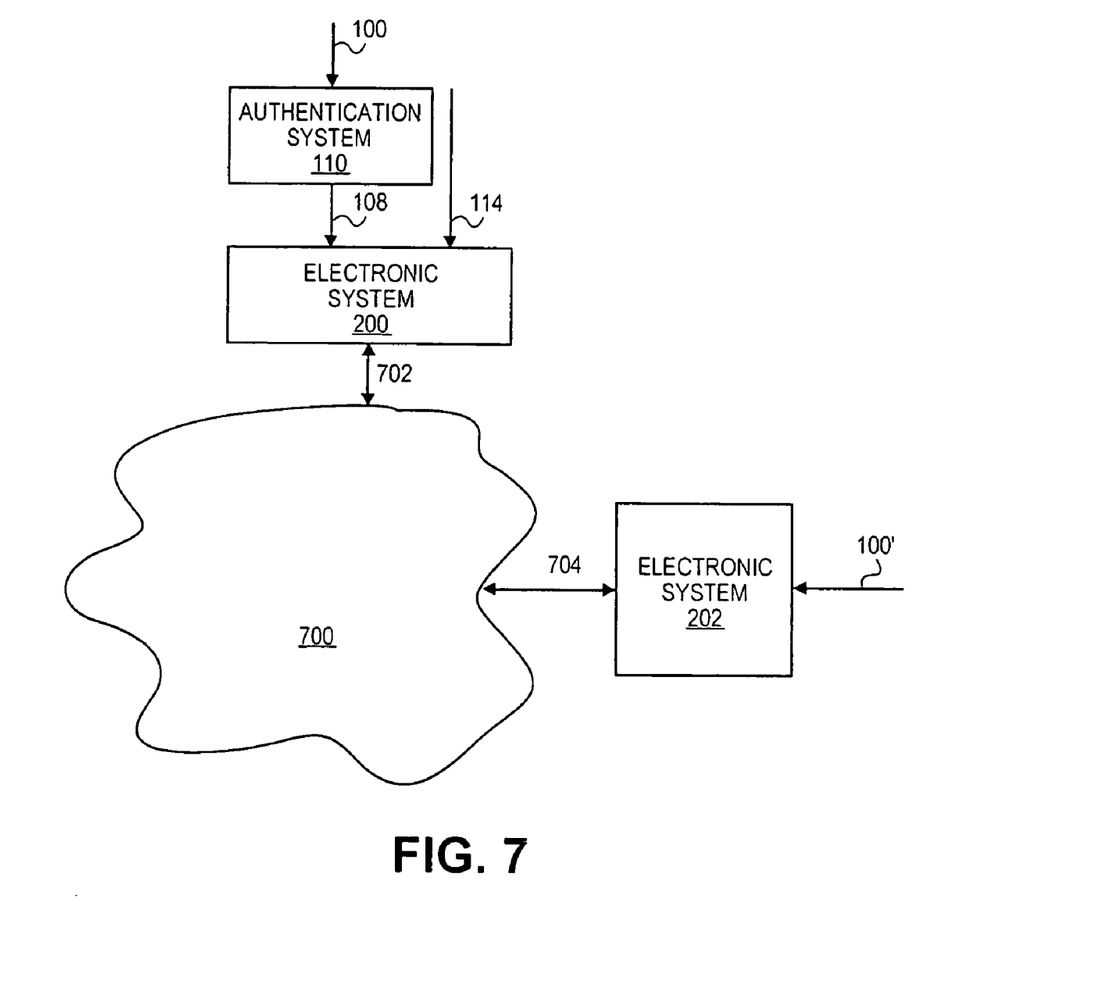
FIG. 7 illustrates a network configuration having an electronic system and an electronic system.

Aside from generating the comparison result, data analyzer 516 may also incorporate the user's identity information with input data 114. In one embodiment, systems utilizing authentication system 110 are connected in network 700 as shown in FIG. 7. When electronic system 200 transmits data via signal path 702 and network 700 to electronic system 202, embedding identity information with input data 114 helps electronic system 202 to identify the source of its received data.

To illustrate this networked scenario, a previously discussed example involving a student taking an on-line exam administered by a university is further elaborated. As authentication system 110 of electronic system 200 validates the student's identity based on the student's biometric data 100, authentication system 110 also combines the student's identity information with the student's attempted answers to the examination in its output signal 108. When the university's electronic system 202 receives data through its signal path 704 and network 700, electronic system 202 can verify whether its received responses are indeed from the student at electronic system 200 based on the embedded identity information. Since authentication system 110 of electronic system 200 continuously validates the student's identity, electronic system 202 can be reasonably assured of the authenticity of its received data's source.

Many approaches are available to embed identity information within input data 114. For instance, data structures of applications, operating systems or network software employed by electronic systems 200 or 202 may extend their data fields to include this additional information.

Although two identity references are specifically mentioned to demonstrate one of data compiler's processes of constructing a user's biometric data, it should have been apparent to one ordinarily skilled in the art to employ only one identity reference to achieve the same goal. Additionally, instead of directly feeding into data analyzer 516, user information 112 may first be stored in database 506 before being transmitted to data analyzer 516 for processing through signal path 514.

Thus, a method and apparatus for authenticating a user's identity have been disclosed. Although the present invention has been described particularly with reference to the figures, the present invention may appear in any number of systems, which provide the disclosed authentication capabilities. A person ordinarily skilled in the art may combine the functionality of the disclosed functional blocks, such as sensor 500 and signal converter 504. The ordinary artisan may also distribute certain functional blocks from data collector 102 to data matcher 106 or from data matcher 106 to data collector 102. It is further contemplated that other changes and modifications may be made by one of ordinary skill in the art without departing from the spirit and scope of authentication system 110.

What is claimed is:

1. An apparatus for authenticating a user's identity, comprising:
   a. a data collector to receive and collect a stream of biometric data; and
   b. a data matcher to process the biometric data from the data collector to authenticate the user's identity, wherein the data matcher includes:

a database to store a first identity reference for the user, and a data compiler, coupled to the database, the data compiler to integrate samples of data collected by the data collector collected over time to create a second identity reference and replace the first identity reference with the second identity reference to establish an updated first identity reference.

2. The apparatus of claim 1, wherein the data collector further comprising:
   a. a plurality of sensors to detect the stream of biometric data; and
   b. a signal converter to convert the biometric data from the sensors into storable data and send the storable data to the data matcher.

3. The apparatus according to claim 1, wherein the data matcher further comprises:
   a data analyzer, coupled to the database, to receive user information and to authenticate the user's identity by comparing the user information and the first identity reference and for presenting a comparison result.

4. The apparatus according to claim 3, wherein the data analyzer further receives input data from the user and embeds the first reference identity in the input data.

5. The apparatus according to claim 1 is coupled to a network.

6. The apparatus according to claim 3, wherein the user information can be downloadable from an external database through a network.

7. A method for authenticating a user's identity, comprising:
   a. receiving and collecting a stream of biometric data;
   b. processing the biometric data to authenticate the user's identity;
   c. storing a first identity reference and collected biometric data in a database;
   d. sampling the collected biometric data over time;
   e. integrating the samples of collected biometric data to create a second identity reference; and
   f. replacing the first identity reference with the second identity reference to establish an updated first identity reference.

8. The method according to claim 7, wherein 7(*a*) further comprises:
   a. detecting the stream of biometric data by a plurality of sensors;
   b. converting the biometric data from the sensors into storable data; and
   c. sending the storable data to a data matcher.

9. The method according to claim 7, wherein 7(*b*) further comprises:
   a. receiving user information;
   b. authenticating the user's identity by comparing the user information and the first identity reference; and
   c. presenting a comparison result.

10. The method according to claim 9, wherein 9(*b*) further comprises:
    a. receiving input data from the user; and
    b. embedding the first reference identity in the input data.

11. A machine readable medium having embodied thereon instructions, which when executed by an electronic system, causing the electronic system to:
    a. receive and collect a stream of biometric data;
    b, process the biometric data to authenticate the user's identity;
    c. store a first identity reference and collected biometric data to a database;
    d. sample the collected biometric data over time;
    e. integrate the samples of collected biometric data to create a second identity reference; and
    f. replace the first identity reference with the second identity reference to establish an updated first identity reference.

12. The machine readable medium according to claim 11, wherein said instructions for 11(*a*) further comprises:
    a. detecting the stream of biometric data by a plurality of sensors;
    b. converting the biometric data from the sensors into storable data; and
    c. sending the storable data to a data matcher.

13. The machine readable medium according to claim 11, wherein said instructions for 11(*b*) further comprises:
    a. receiving user information;
    b. authenticating the user's identity by comparing the user information and the identity reference; and
    c. presenting a comparison result.

14. The machine readable medium according to claim 13, wherein said instructions for 17(*b*) further comprises:
    a. receiving input data from the user; and
    b. embedding the reference identity in the input data.

15. The machine readable medium according to claim 11, wherein the electronic system is coupled to a network.

* * * * *